Oct. 12, 1937.   A. J. BOYD   2,095,912
INFLATING VALVE
Filed Feb. 27, 1937   2 Sheets-Sheet 1
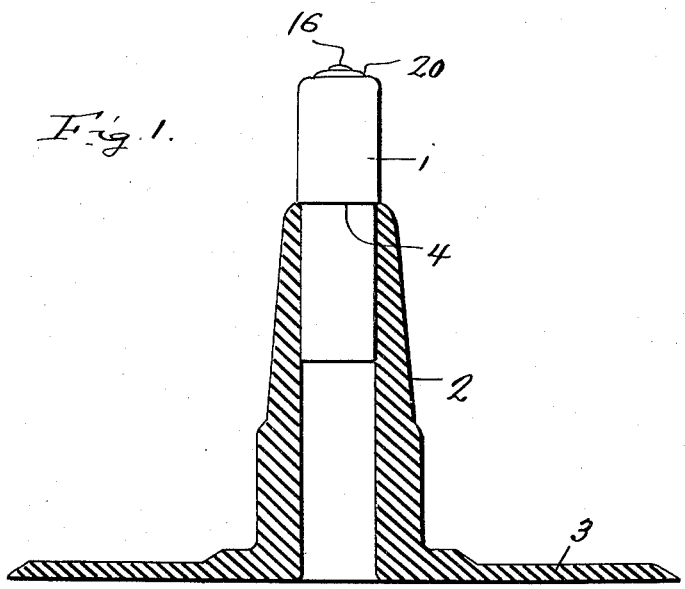
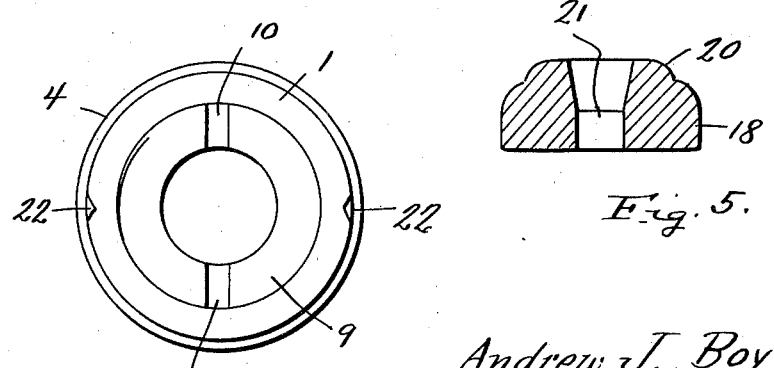
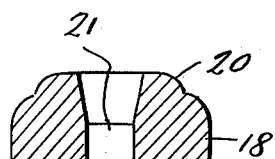
Inventor
Andrew J. Boyd
By Clarence A. O'Brien
Hyman Berman
Attorneys Oct. 12, 1937.  A. J. BOYD  2,095,912
INFLATING VALVE
Filed Feb. 27, 1937  2 Sheets-Sheet 2
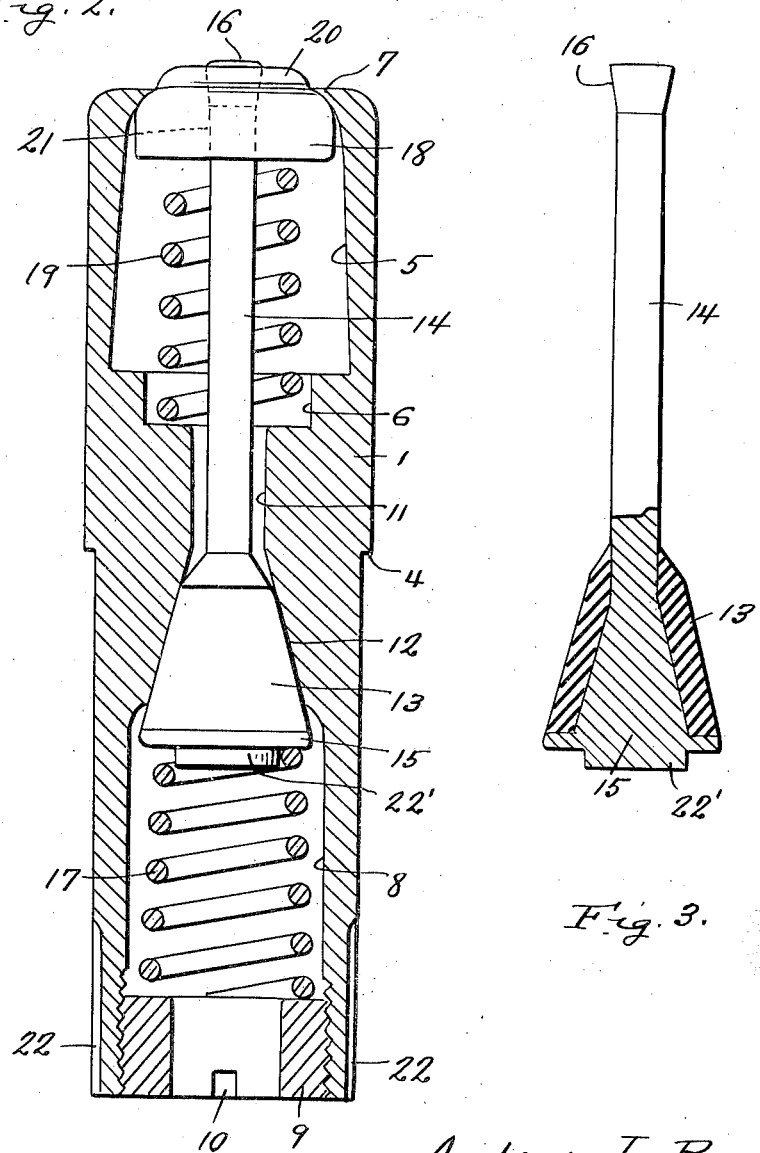
Inventor
Andrew J. Boyd
By Clarence A. O'Brien
Hyman Berman
Attorneys Patented Oct. 12, 1937

2,095,912

UNITED STATES PATENT OFFICE 2,095,912

INFLATING VALVE

Andrew Jackson Boyd, Clayton, N. Mex.

Application February 27, 1937, Serial No. 128,289

2 Claims. (Cl. 152—12)

The present invention relates to new and useful improvements in inflating valves particularly for pneumatic tire tubes having rubber valve stems and has for one of its important objects to provide, in a manner as hereinafter set forth, a device of this character embodying a novel construction, combination and arrangement of parts whereby the necessity for the usual dust cap for keeping out dirt, water and other foreign matter will be completely overcome.

Another very important object of the invention is to provide an inflating valve of the aforementioned character wherein the tension of the closing spring may be conveniently adjusted or regulated as desired prior to the installation of the device in the rubber stem of the tube.

Still another very important object of the invention is to provide an inflating valve for pneumatic tires wherein the necessity for replacing the core from time to time during the life of the tube will be eliminated.

Other objects of the invention are to provide an inflating valve of the character described which will be comparatively simple in construction, strong, durable, highly efficient and reliable in use, compact and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is an elevational view, showing an inflating valve constructed in accordance with the present invention mounted in a rubber inner tube stem, said stem being shown in section.

Figure 2 is a view in vertical section through the invention.

Figure 3 is a detail view partially in elevation and partially in section of the air retaining valve.

Figure 4 is an elevational view, looking at the lower or inner end of the invention.

Figure 5 is a detail view in cross section through the valve which excludes dirt, water and other foreign matter.

Referring now to the drawings in detail, it will be seen that the embodiment of the invention which has been illustrated comprises a substantially tubular casing 1 of suitable metal which is adapted to be vulcanized in a conventional rubber stem 2 of an inner tube 3 in a manner to project beyond the free end of said stem, as illustrated to advantage in Fig. 1 of the drawings. At an intermediate point, the tubular casing 1 is formed to provide an external shoulder 4 which abuts the free end of the rubber stem 2.

In the upper end portion of the casing 1 is a chamber 5 which is tapered in the manner shown to advantage in Fig. 2 of the drawings. The chamber 5 includes a reduced lower portion 6. The upper end of the casing 1 is turned inwardly in a manner to provide a seat 7.

In the lower portion of the casing 1 is a chamber 8 into the lower end portion of which a ring 9 is threaded. The ring 9 is provided with aligned grooves 10 in its lower end for receiving a suitable tool, such as a screw driver. At an intermediate point the casing 1 is provided with a comparatively small bore 11 establishing communication between the chambers 5 and 8. The lower portion of the bore 11 is tapered in a manner to provide a substantially conical valve seat 12.

Engageable with the seat 12 is a substantially conical rubber air retaining valve 13 on the lower end of a stem 14. The air retaining valve 13 includes a metallic core 15 which is an integral part of the stem 14. The stem 14 extends upwardly through the bore 11 and the chamber 5 and projects slightly beyond the upper end of the casing 1, when the valve 13 is closed, and terminates in a flared head 16. A coil spring 17 is mounted in the chamber 8 and has one end engaged with the ring 9 and its other end engaged with the valve 13 for yieldingly urging said valve toward the seat 12.

Slidably mounted on the stem 14 and operable in the chamber 5 is a foreign matter excluding valve 18 which is engageable with the seat 7. A coil spring 19 encircles the stem 14 and has one end engaged with the bottom of the reduced portion 6 of the chamber 5 and its other end engaged beneath the foreign matter excluding valve 18 for yieldingly urging said valve toward the seat 7. The valve 18 includes a substantially rounded upper portion 20 which protrudes beyond the seat 7 and the upper end of the casing 1. Also, the upper portion of the bore 21 of the valve 18 which accommodates the stem 14 is flared for the reception of the substantially correspondingly shaped head 16 of said stem 14.

It will thus be seen that an inflating valve has been provided which will retain air for a comparatively long time with little loss from leakage due, to a considerable extent, to the fact that substantially all foreign matter will be excluded at all times. The valve 13, when the tire is inflated, is maintained in engagement with the seat 12 by the air pressure and, of course, the greater the pressure the tighter said valve will be seated. When the tire or tube is deflated the spring 17 maintains the valve 13 in engagement with the seat 12. In assembling the device the valve 18 and the spring 19 are inserted in the chamber 5 after which this end of the casing 1 is turned to form the seat 7. The stem 14 with the valve 13 are then inserted from the lower end of the casing 1, the spring 17 is inserted in the chamber 8 behind the valve 13, after which the ring 9 is inserted and adjusted as desired to regulate the tension of said spring 17. The lower end portion of the casing 1 is then squeezed or grooved, as at 22, or otherwise slightly distorted in a manner to permanently secure the ring 9 in adjusted position. The device is then ready to be vulcanized in the rubber tube stem 2. As previously stated, the valve 18 prevents the entrance of foreign matter and its substantially rounded, protruding portion 20 will have a tendency to cause any foreign matter that may collect thereon to be blown away when the nozzle of an air hose is applied. Of course, when the tire is being inflated the valve 18 is unseated against the tension of the spring 19 and the valve 13 is unseated against the tension of the spring 17. The casing 1 is of rugged construction to withstand hard use and to resist damage should a puncture or blowout occur. A projection 22' depends from the core 15 for retaining the upper end of the spring 17 in position.

It is believed that the many advantages of a tire inflating valve constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:—

1. A tire inflating valve of the class described comprising a substantially tubular one piece casing having chambers in its end portions, said casing further having a longitudinal bore extending between the chambers, one end portion of said bore being substantially conical for providing a valve seat, a substantially conical valve member engageable with the seat, a ring threadedly mounted in one of the chambers, a coil spring mounted in said one chamber and having one end engaged with the ring and its other end engaged with the valve member for yieldingly urging said valve member toward the seat, said valve member including an integral stem extending through the bore and the other chamber and projecting from one end of the casing, a head formed on the free end of the stem, a seat on said one end of the casing, a valve member slidably mounted on the stem and engageable with the second named seat, the second named valve member including a substantially rounded protuberance projecting from said one end of the casing, said second named valve member having a bore therein accommodating the stem, one end portion of the second named bore being enlarged for the snug reception of the head, and a coil spring mounted in said other chamber and encircling the stem and engaged with the second named valve member for yieldingly urging the same toward the second named seat.

2. A valve of the class described comprising a casing of elongated form and of one piece of material and having a chamber in each end opening out through said end and a bore connecting the chambers together and one end of the bore being shaped to provide a valve seat, a valve engaging the seat and having a stem passing through one chamber and projecting from the casing and having its extremity enlarged and tapered inwardly, the end of the casing through which the stem projects being formed to provide an internal valve seat, a valve engaging the seat and having an opening therein for the passage of the stem, the outer end of the opening being enlarged and flared to engage the tapered head of the stem, a spring for holding the said last-mentioned valve on its seat, a spring in the other chamber for holding the first-mentioned valve on its seat and means for holding the last-mentioned spring in the chamber.

ANDREW J. BOYD.